Figures 1, 2:
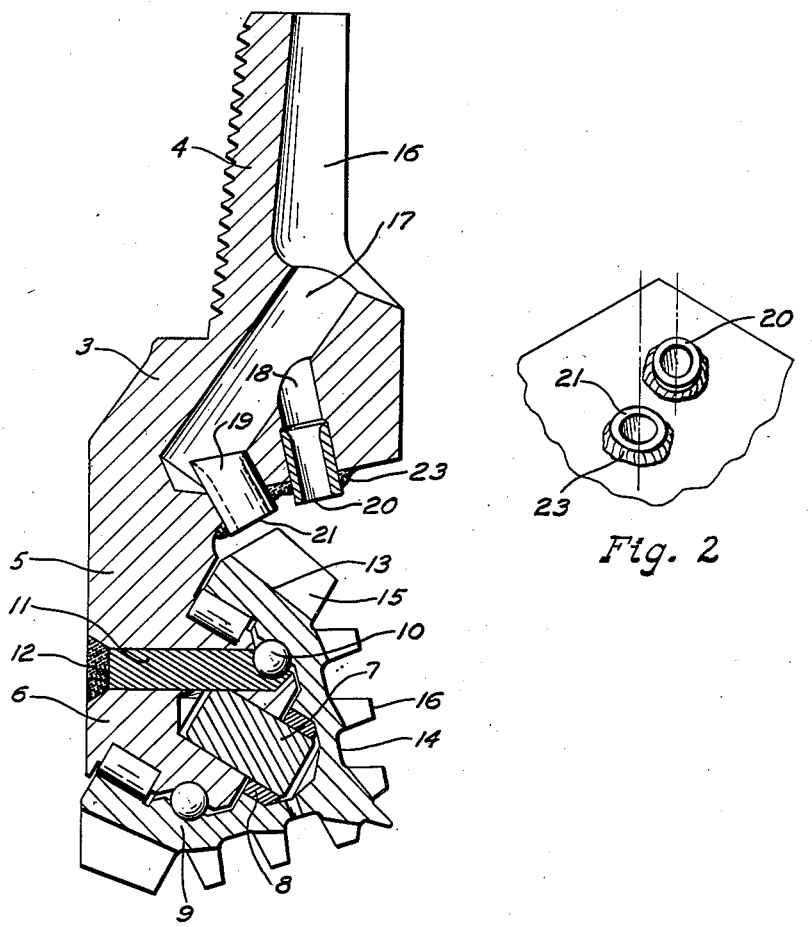

Jan. 11, 1938.       R. P. SHERMAN       2,104,823
CUTTER FLUSHING DEVICE
Filed June 11, 1937

Ralph P. Sherman
INVENTOR
BY Jesse R. Stone
ATTORNEY

Patented Jan. 11, 1938

2,104,823

UNITED STATES PATENT OFFICE 2,104,823

CUTTER FLUSHING DEVICE

Ralph P. Sherman, Houston, Tex., assignor to Hughes Tool Company, Houston, Tex., a corporation of Delaware Application June 11, 1937, Serial No. 147,745

5 Claims. (Cl. 255—71)

My invention relates to the provision in a drill bit with cone cutters, of a means for effectively flushing the cutters with fluid so that mud and adhesive material from the well bottom will be removed therefrom.

Slow drilling, particularly in soft or sticky formations, is often due to the fact that the material from the well bottom adheres to the cutter and fills up the spaces between the teeth and by balling up the cutter, prevents the teeth from penetrating. It is important that this muddying up of the cutters be prevented so far as possible.

It is therefore an object of the invention to provide an efficient system for discharging flushing fluid across the cutters so as to pass between the teeth of the cutter in a direction at approximately right angles to the sides of the teeth and longitudinally of the cutting surfaces.

It is desired that the flushing fluid be discharged in a direction approximately parallel with the taper of the cone.

In the drawing herewith, Figure 1 is a central longitudinal section through one section of a drill head having a cutter thereon and employing my improvement.

Figure 2 is a broken perspective view of the fluid discharge openings in the drill body and indicating their offset position.

The drill upon which my invention is shown is of the same general construction as that shown in the patent to Scott et al; No. 1,983,316 issued December 4, 1934. The head has three sections. One such section 3 is shown in Figure 1. The head has an upwardly tapered and threaded shank 4, for engagement by the drill stem. The head 3 has a downwardly extending leg 5 upon which is formed a downwardly and inwardly inclined shaft 6. Said shaft has an inserted pilot pin 7 in the end thereof and a bushing ring 8 on said pin.

An approximately conical cutter shell 9 is mounted upon said shaft, the interior of the shell being shaped to fit over said shaft and the antifriction bearings thereon. Said cutter is held in rotatable position upon said shaft by the balls 10 which are inserted into locking position through a transverse bore closed later by a plug 11 and welding material 12.

The outer surface of the cutter is formed with two tapered areas. The area 13 adjacent to the base is more nearly cylindrical than is the area 14 adjacent to the apex which tapers to an apex short of the central axis of the hole being drilled. The area or zone 13 has large cutting teeth 15 thereon and the area 14 has rows of smaller chisel-shaped teeth 16 thereon.

The shank 4 of the drill head has a central opening or passage 16 therein for flushing fluid pumped down through the drill stem in the usual manner. From the passage 16 each section of the head has a laterally inclined duct or channel 17. From the channel 17 are two branch discharge openings or nozzles 18 and 19. At the discharge end of these openings are short tubes 20 and 21 respectively which form nozzles directed so as to most effectively discharge the flushing fluid upon the cutter 9.

It will be noted that nozzle 20 is directed and positioned so as to discharge the fluid approximately parallel with the tapered surface 14. The fluid will engage the teeth 16 directly against the upper sides and pass between adjacent teeth so as to cut away such mud as may tend to adhere thereto. Also the nozzle 19 is directed approximately parallel to the tapered area 13 so as to most effectively cut away material adhering thereto.

It is also found best to stagger the nozzles so that they will not lie in the same diametrical plane. In Figure 2 it will be seen that the nozzles are arranged so that neither stream of flushing fluid issuing from its nozzle will interfere with the action of the other. There will be no tendency of the lateral splashing of fluid from one nozzle counteracting the force of the fluid from the adjacent nozzle. The nozzles may be made of hard wear-resisting material and are held in position by bonds of welding material 23 which may be cut away with a torch to remove the tubes which form the nozzles. New tubes may thus replace the old ones when the old ones become worn.

By the use of these discharge nozzles positioned as described relative to the cutters, materially faster drilling is obtained, particularly in the softer formations. The material is not only carried from the hole by the flushing fluid, but the cutters themselves are kept clear so that the teeth of the cutters will penetrate the formations and thus assure continued progress.

What I claim as new is:

1. In a well drill, a head, a plurality of downwardly and inwardly inclined shafts thereon, a cutter on each of said shafts, said cutter being approximately conical in shape, but having an acutely tapered area adjacent to the base and a more obtusely tapered area adjacent to the apex, a fluid passage in said head for flushing fluid, and nozzles receiving fluid from said passage, one nozzle being directed approximately parallel to the acutely tapered area and the other directed approximately parallel with the more obtuse area.

2. A well drill including a head, downwardly and inwardly inclined cutter shafts thereon, a cutter of approximately conical shape on each shaft, said cutter having thereon a plurality of circumferential zones each of which tapers toward the apex at a different angle from the other, a flushing fluid passage through said head, and a plurality of discharge nozzles connected to receive fluid from said passage, each nozzle being directed to discharge flushing fluid approximately parallel with the taper of the adjacent zone of the cutter.

3. A well drill including a head, downwardly and inwardly inclined cutter shafts thereon, a cutter of approximately conical shape on each shaft, said cutter having thereon a plurality of circumferential zones each of which tapers toward the apex at a different angle from the other, a flushing fluid passage through said head, and a plurality of discharge nozzles connected to receive fluid from said passage, each nozzle being directed to discharge flushing fluid approximately parallel with the taper of the adjacent zone of the cutter, said nozzles being positioned to lie in different diametrical planes.

4. A drill bit head, a shaft thereon, an approximately conical shaped cutter on said shaft, said cutter having a cutting zone adjacent to the base thereof tapered at such an angle as to come to an apex beyond the apex of the forward tapered zone, a passage for flushing fluid through said head, and nozzles leading from said passage arranged to discharge flushing fluid parallel with the tapered surface of each of said zones longitudinally thereof, said nozzles being offset from each other diametrically of the drill head.

5. In a well drill, cutters mounted thereon and formed with the tapered zones on the cutting area of the same, said zones being tapered at different angles, the combination of discharge nozzles for flushing fluid directed to project the flushing fluid longitudinally of the cutter and parallel with the surface of said tapered zones so as to remove the mud therefrom.

RALPH P. SHERMAN.